Jan. 25, 1944.    L. W. REAUME    2,339,947
BICYCLE CONTAINER
Filed Jan. 12, 1942    3 Sheets-Sheet 1
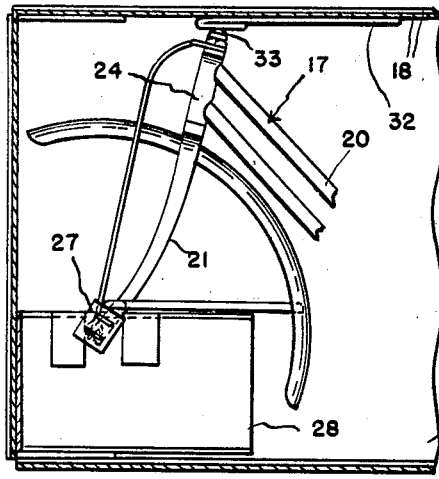
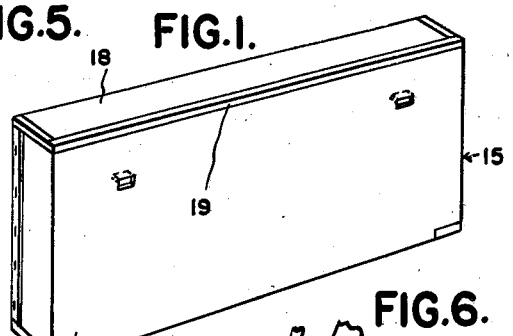
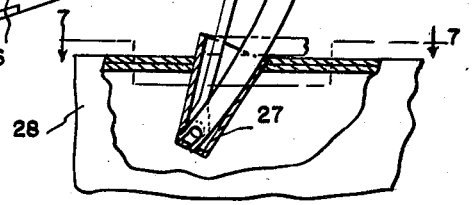
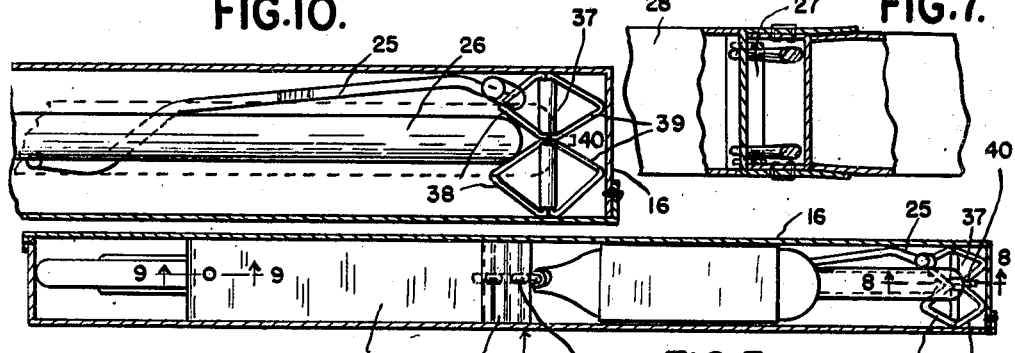
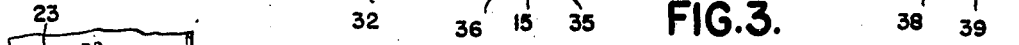
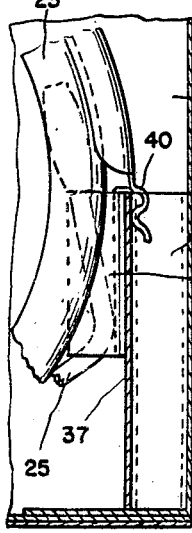
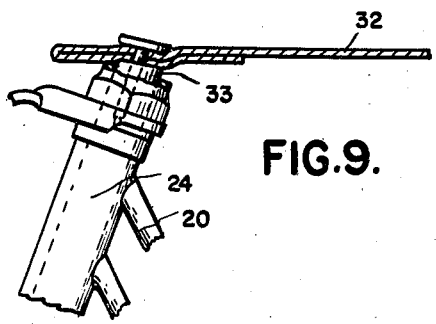
INVENTOR
LAWRENCE W. REAUME
BY
Whittemore Hulbert & Belknap
ATTORNEYS Jan. 25, 1944. L. W. REAUME 2,339,947
BICYCLE CONTAINER
Filed Jan. 12, 1942 3 Sheets-Sheet 2
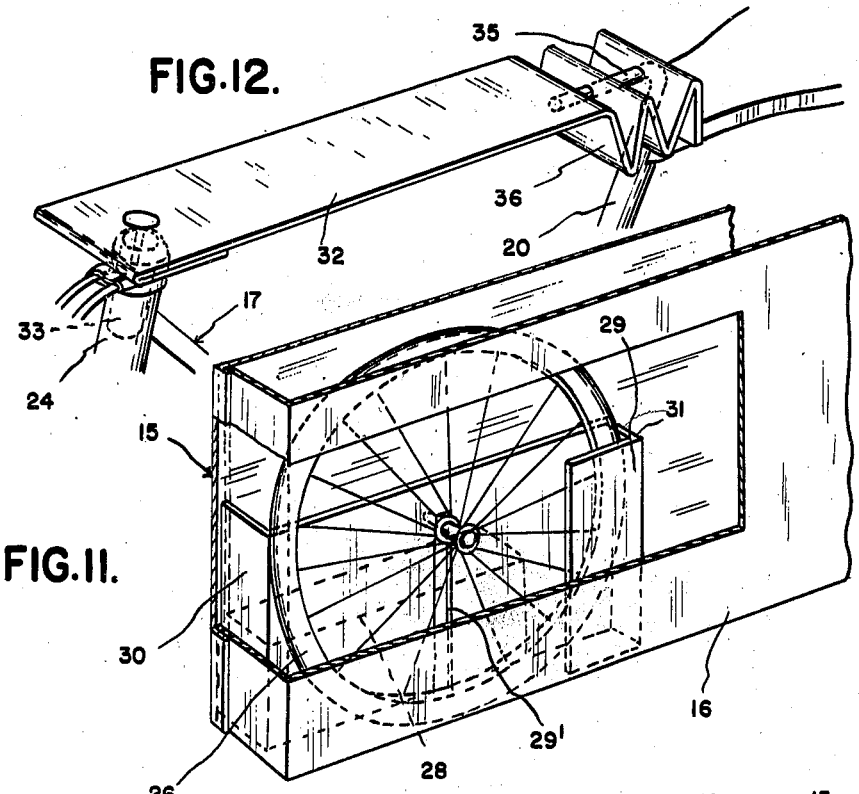
FIG.12.
FIG.11.
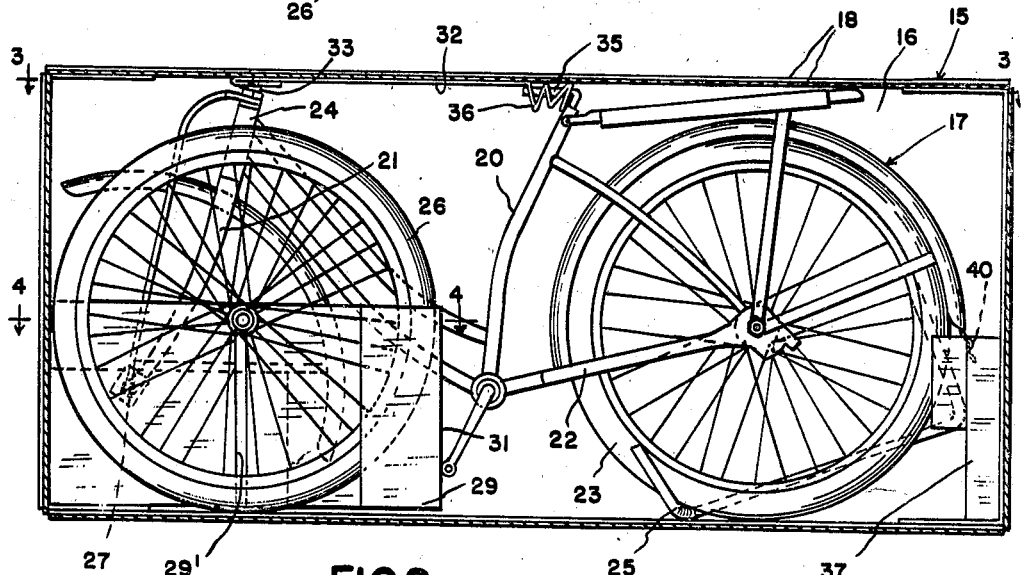
FIG.2.
INVENTOR
LAWRENCE W. REAUME
BY Whittemore Hulbert & Belknap
ATTORNEYS Jan. 25, 1944.　　　L. W. REAUME　　　2,339,947
BICYCLE CONTAINER
Filed Jan. 12, 1942　　　3 Sheets-Sheet 3

INVENTOR
LAWRENCE W. REAUME
BY
ATTORNEYS

Patented Jan. 25, 1944

2,339,947

UNITED STATES PATENT OFFICE 2,339,947

BICYCLE CONTAINER

Lawrence W. Reaume, Monroe, Mich., assignor to River Raisin Paper Company, Monroe, Mich., a corporation of Michigan Application January 12, 1942, Serial No. 426,528

14 Claims. (Cl. 206—46)

This invention relates generally to packing cases and refers more particularly to packing cases for bicycles.

It is one of the principal objects of this invention to provide a bicycle packing case which is small in size as compared to the bicycle and which renders it possible to ship the bicycle with substantially all of the various parts in assembled relationship.

Another object of this invention is to provide a bicycle packing case having a container for receiving the bicycle and having spacing means positioned in the container for engaging different parts of the bicycle to hold the latter from shifting movement relative to the container.

Another feature of the present invention is to provide a carton in the container for receiving certain parts of the bicycle and having a top wall formed with a pocket for receiving the lower end of the front fork of the bicycle frame to hold the latter from shifting movement relative to the container.

Still another object of the present invention is to provide a spacer in the form of a strip of paper board having a width approximating the width of the container and located in the container above the bicycle frame with the opposite side edges contacting the adjacent side walls of the container.

A further object of this invention is to provide a spacer of the type set forth in the preceding paragraph having means at the forward end attachable to the bearing on the bicycle frame for the front wheel supporting fork and having the rear end attachable to the seat supporting post on the bicycle frame.

A still further feature of the present invention is to provide means in the container for supporting the front wheel of the bicycle to one side of the forward portion of the frame in a manner to prevent shifting movement of the front wheel relative to the container and bicycle frame.

The foregoing as well as other objects will be made more apparent as this description proceeds, especially when considered in connection with the accompanying drawings, wherein:

Figure 1 is a perspective view of a packing case forming the subject matter of this invention;

Figure 2 is a longitudinal sectional view through the packing case shown in Figure 1 and illustrating a bicycle therein;

Figure 3 is a sectional view taken substantially on the plane indicated by the line 3—3 of Figure 2;

Figure 5 is a fragmentary elevational view partly in section of the front portion of the packing case;

Figure 6 is a fragmentary side elevational view partly in section of the positioning means provided in the packing case for the front end of the bicycle frame;

Figure 7 is a sectional view taken on the line 7—7 of Figure 6;

Figure 8 is a sectional view taken on the line 8—8 of Figure 3;

Figure 9 is a sectional view taken on the line 9—9 of Figure 3;

Figure 10 is a horizontal sectional view illustrating the spacer provided at the rear end of the bicycle;

Figure 11 is a fragmentary perspective view illustrating the means for positioning the front wheel of the bicycle in the container;

Figure 12 is a perspective view showing the spacer provided at the top of the bicycle frame;

Figure 4:
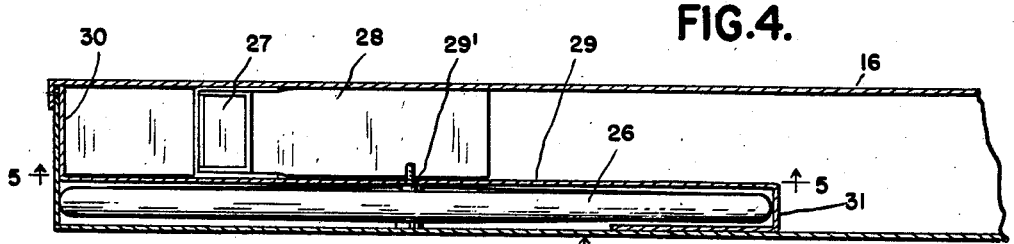
Figure 4 is a sectional view taken on the line 4—4 of Figure 2.

Referring now more in detail to the drawings, it will be noted that the reference character 15 designates a bicycle packing case having a container 16 preferably formed of an inexpensive, bendable material, such as paper board, and being of sufficient size to adequately enclose a bicycle assembly 17. In the present instance, the bicycle subassembly 17 together with the spacers and other parts of the bicycle to be more fully hereinafter referred to are packed into the container 16 through the top of the latter. In this connection, it will be noted that the top wall of the container is formed by superimposed flaps 18 adapted to be held in their closed positions by means of tape 19 and capable of being readily folded back to permit the several parts of the bicycle to be removed from the container through the top of the latter.

Briefly described, the bicycle subassembly 17 is provided with a frame 20 having a front wheel supporting fork 21 and having a rear wheel supporting fork 22. A rear wheel 23 forms a part of the subassembly 17 and is carried by the fork 22 in accordance with conventional practice. The upper end of the front wheel supporting fork 21 is journaled in a bearing 24 at the forward end of the frame 20 in accordance with the usual practice and is adapted to be connected to the handle bar 25 of the bicycle. The handle bar 25 does not form a part of the subassembly 17 and is held in the container 16 in a manner to be presently described.

The length of the container 16 is less than the overall length of a completely assembled bicycle and, accordingly, the front wheel 26 is positioned in the container to one side of the front portion of the bicycle frame. It is, of course, necessary to hold the bicycle subassembly 17 and other separable parts of the bicycle in the container against shifting movement relative to each other. Upon reference to Figures 5 to 7, inclusive, it will be noted that the lower end of the front fork 21 extends into a pocket 27 which is formed in the top wall of a carton 28. The carton 28 is preferably formed of paper board and is supported on the bottom wall of the container 16 adjacent the front end of the latter. This carton is of sufficient size to house smaller parts of the bicycle, such as the pedals, seat, and tool accessories. The pocket 27 is formed of heavier paper stock and the top wall of the carton is slotted to receive the pocket.

The front wheel 26 is adapted to be positioned in the container to one side of the carton 28 and is held against shifting movement in the container by a spacer 29. The spacer 29 is in the form of a sheet of paper board having the forward end 30 bent laterally and extended between the front end of the carton 28 and the adjacent wall of the container. The rear end 31 of the spacer 29 is return bent to extend around the rear side of the wheel 26 to a position between one side of the wheel 26 and the adjacent side of the container. A vertical slot 29' is formed in the body portion of the spacer intermediate the front and rear edges thereof for receiving the axle of the front wheel. The arrangement is such as to permit the spacer to be inserted into the container through the top of the latter after the bicycle subassembly and front wheel have been inserted therein.

The upper portions of the bicycle subassembly 17 are positioned in the container by a spacer 32 in the form of an elongated strip of paper board having a width substantially equal to the width of the container and located above the bicycle frame 20 with the opposite side edges abutting the adjacent sides of the container. The forward end of the spacer 32 is provided with a plug 33 adapted to be slipped into the upper end of the bearing 24 on the frame 20, and the rear end of the spacer is attachable to the bicycle seat supporting post 35. Upon reference to Figure 2, it will be noted that the rear end of the spacer 33 is bent to form a series of collapsible bellows like corrugations 36, and these corrugations are provided with aligned openings for engagement when collapsed with the horizontal member of the bicycle seat supporting post 35.

The rear end of the bicycle is held from shifting movement in the container by a spacer 37 preferably identical in construction to the spacer shown and described in my copending application, Serial No. 233,662, filed May 6, 1940. Briefly described, the spacer 37 is formed of paper board bent to provide oppositely extending pairs of V-shaped projections 38 and 39 respectively. The projections 38 form a recess for receiving the rear portion of the rear wheel 23 on the bicycle frame, and the projections 39 abut the rear wall of the container. As a result of the above construction, the spacer 37 has a wedging action with the tire on the rear wheel 23 and the spacer is tensioned to some extent so as to securely hold the bicycle in position regardless of any flexing of the rubber tire. It may be pointed out at this time that the handle bar 25 is positioned in the container with one of the gripping portions extending downwardly through one of the V-shaped projections 38 on the spacer 37 and with the other gripping portion extending to the opposite side of the rear wheel 23 on the bicycle frame. In the event that the bicycle is provided with a latch 40 for the usual standard, this latch may be extended over the upper end of the spacer 37 in the manner shown in Figure 8 to assist in holding the bicycle against shifting movement relative to the container.

It follows from the foregoing that I have provided a relatively simple, inexpensive packing case which is relatively small in size as compared with the bicycle to be packed therein and which embodies spacing means for preventing shifting movement of the bicycle parts relative to the container. It will also be noted that the spacing means employed in the packing case is inexpensive and may be readily assembled in the container with the different parts of the bicycle.

Figure 13:
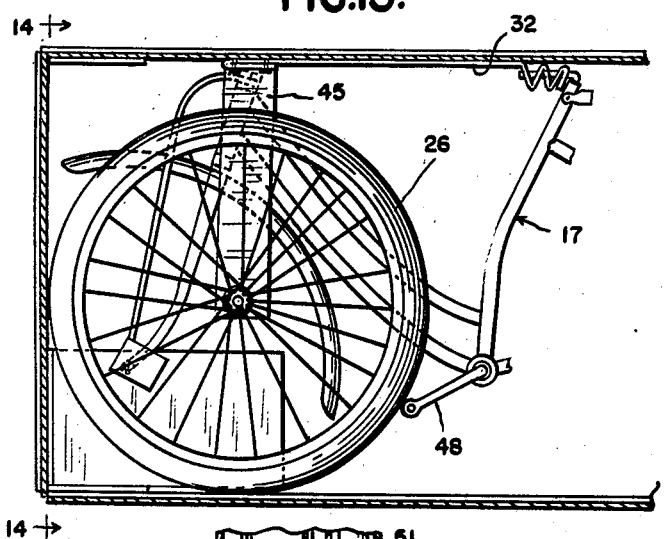
Figure 13 is a fragmentary side elevational view partly in section of a slightly modified form of construction.
Figure 14:
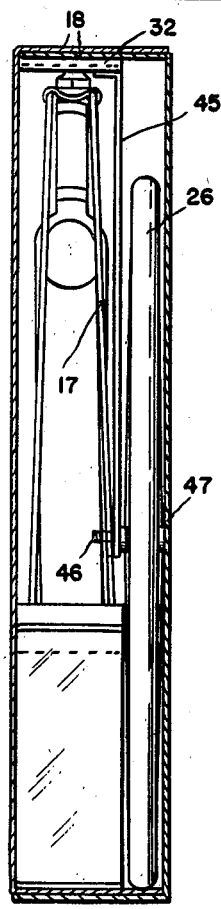
Figure 14 is a sectional view taken on the line 14—14 of Figure 13.

In Figures 13 and 14, I have illustrated a somewhat different arrangement for positioning the front wheel 26 of the bicycle in the casing to one side of the subassembly 17 of the bicycle. In this embodiment the spacer 29 is omitted and is replaced by a spacer 45 in the form of a strip of cardboard having the upper end stitched or otherwise secured to the forward end of the spacer 32. The spacer 45 extends downwardly from the spacer 32 between the forward end of the subassembly 17 and the front wheel 26. As shown in Figure 14, the lower end of the spacer 45 is folded and is apertured to receive the inner end of the axle 46 for the front wheel. The folded portion of the spacer cooperates with the adjacent side wall 47 of the container to position the front wheel 26 laterally and to prevent any part of the wheel from rubbing against the bicycle frame. Rearward movement of the wheel 26 relative to the bicycle frame is resisted by the crank 48 of the bicycle which is located in the position shown in Figure 13 when the bicycle is packed. As shown in Figure 13, the front side of the wheel abuts the adjacent wall of the container and the rear side of the wheel abuts the crank 48 so that fore and aft movement of the wheel 26 in the container is prevented.

Figure 16:
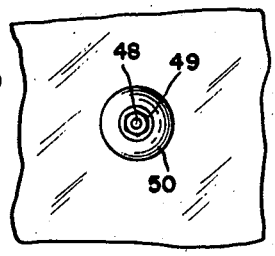
Figure 16 is a fragmentary side elevational view of the construction shown in Figure 15.
Figure 15:
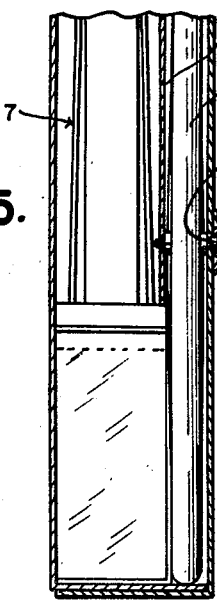
Figure 15 is a vertical sectional view illustrating a further embodiment of the invention.

In Figures 15 and 16, I have shown still another way for positioning the front wheel 26 of the bicycle in the container to one side of the subassembly 17. Upon reference to Figure 15, it will be noted that the outer end 48 of the axle extends through an opening in the adjacent side wall of the container and is secured to this side wall by the nut 49 which forms a part of the axle assembly. A suitable washer 50 is provided between the nut 49 and the adjacent side wall of the container so as to effectively clamp the wheel 26 to the container. The washer 50 is countersunk to receive the nut 49 so that the latter will not have a tendency to interfere with any articles that may be supported adjacent the container.

Referring again to Figure 15, it will be noted that the bicycle wheel 26 is prevented from rubbing directly on the adjacent portions of the subassembly 17 by means of a strip of paper 51 located in the space between the front wheel 26 and the subassembly.

What I claim as my invention is:

1. A packing case for a bicycle provided with a frame having a front fork, said case having a container adapted to receive the bicycle in a partially assembled position, means in said container engageable with the rear end of the bicycle to hold the latter against shifting movement relative to the container, and a carton for holding small parts positioned within the container at the front end of the bicycle and having a pocket in the top wall thereof for receiving the lower end portion of the fork on the bicycle frame to hold the frame up and against movement relative to the container.

2. A packing case for a bicycle provided with a frame having a front fork, said case having a container adapted to receive the bicycle in a partially assembled position, a spacer formed of paper board positioned within the container at the rear of the bicycle and folded to form a pocket for receiving a part of the rear end of said bicycle, and a carton of paper board for holding small parts positioned within the container at the front end of the bicycle and having a pocket in the top wall for receiving the lower end portion of the fork on the bicycle frame to hold the same up and the bicycle against movement relative to the container.

3. A packing case for a bicycle provided with a frame having a front fork, said case having a container adapted to receive the bicycle in a partially assembled position, a spacer having a width corresponding to the width of the container and positioned in the container above the bicycle frame with the opposite side edges engaging the adjacent walls of the container, means removably attaching the spacer to the bicycle frame, and a carton for holding small parts positioned within the container at the front end of the bicycle and having a pocket in the top wall for receiving the lower end portion of the fork on the bicycle frame to hold said frame up against the top of the container.

4. A packing case for a bicycle provided with a frame having a front fork, said case having a container adapted to receive the bicycle in a partially assembled position, means in said container engageable with the rear end of the bicycle to hold the latter against shifting movement relative to the container, a carton of lesser width than said container and for holding small parts positioned within the container at the front end of the bicycle and having a pocket in the top wall for receiving the lower end portion of the fork on the bicycle frame to hold the frame against movement relative to the container, a second spacer having a width corresponding to the width of the container and positioned in the container above the bicycle frame with the opposite side edges engaging the adjacent side walls of the container, means removably attaching the second spacer to the forward end of the bicycle frame and collapsible apertured corrugations at the rear end of said second spacer for engaging the same with the horizontal member of the seat supporting post.

5. A packing case for a bicycle provided with a frame including a bearing for the front wheel supporting fork and having a seat supporting post, said case having a container adapted to receive the bicycle frame, a spacer of paper board positioned within the container above the bicycle frame and having a width corresponding to the width of the container, means at the front end of the spacer adapted to be sleeved into the bearing for the front wheel supporting fork, apertured corrugations at the rear end of the spacer engageable with the horizontal member of the seat supporting post on the bicycle frame, a spacer of paper board positioned within the container at the rear end of the bicycle and folded to form a pocket for receiving the adjacent portion of the rear wheel of the bicycle.

6. A packing case for a bicycle provided with a frame, said case having a container adapted to receive the bicycle frame, a spacer of paper board having a width corresponding to the width of the container and positioned in the latter above the bicycle frame with the opposite edges engaging the adjacent side walls of the container, the forward end of said spacer having a pin for engaging the handle receiving socket in said bicycle frame and the rear end having collapsible apertured corrugations for engaging the horizontal member of the seat supporting post, and means in the container at opposite ends of the bicycle and respectively engageable with the front portion of the frame and with the rear wheel of the bicycle to cooperate with the spacer in preventing shifting movement of the bicycle relative to the container.

7. A packing case for a bicycle forming a container of a length to receive the assembled rear wheel and frame of the bicycle including the front steering fork, a carton for holding small parts positioned within the front and bottom portion of said container spaced from one side wall thereof, said carton having a pocket in its top wall for receiving the lower end of said fork and holding the top of said frame adjacent to the top of said container and the space between said carton and said side wall being adapted to receive the detached front wheel positioned to overlap said fork and a portion of the frame.

8. A packing case for a bicycle forming a container of a length to receive the assembled rear wheel and frame of the bicycle including the front steering fork, a carton for holding small parts positioned within the front and bottom portion of said container spaced from one side wall thereof, said carton having a pocket in its top wall for receiving the lower end of said fork and holding the top of said frame adjacent to the top of said container, and the space between said carton and said side wall being adapted to receive the detached front wheel positioned to overlap said fork and a portion of the frame, and a spacer and retainer for said front wheel anchored to said carton.

9. A packing case for a bicycle forming a container of a length to receive the assembled rear wheel and frame of the bicycle including the front steering fork, a carton for holding small parts positioned within the front and bottom portion of said container spaced from one side wall thereof, said carton having a pocket in its top wall for receiving the lower end of said fork and holding the top of said frame adjacent to the top of said container and the space between said carton and said side wall being adapted to receive the detached front wheel positioned to overlap said fork and a portion of the frame, and a spacer and retainer for said front wheel having an angle flange anchored between said carton and front wall of said container, and a U-shaped rear portion embracing said wheel.

10. A packing case for a bicycle forming a container of a length to receive the assembled rear wheel and frame of the bicycle including the front steering fork, a carton for holding small parts positioned within the front and bottom portion of said container spaced from one side wall thereof, said carton having a pocket in its top wall for receiving the lower end of said fork to hold the front portion of said frame elevated substantially to the level of the rear portion thereof and so as to be adjacent to the top of said container, a lateral spacer for said frame within said container having its forward portion engageable with the handle socket of said steering fork and its rear portion collapsible and apertured to engage the horizontal member of the seat supporting post, the space between said carton and side wall of the container being adapted to receive the detached front wheel overlapping said fork and a portion of the frame, and a retainer for holding said front wheel in such position.

11. In a packing case for a bicycle, a lateral spacer for the bicycle frame formed of paper board, said spacer being of a width to fit between the side walls of the case being provided at its forward end with a pin for engaging the handle socket of the bicycle and having at its rear end a series of bellows like corrugations collapsible and apertured to engage the forwardly extending horizontal portion of the seat supporting post.

12. A packing case for a bicycle forming a container of a length to receive the assembled rear wheel and frame of the bicycle including the front steering fork, a carton for holding small parts positioned within the front and bottom portion of said container spaced from one side wall thereof, said carton having a pocket in its top wall for receiving the lower end of said fork and holding the top of said frame adjacent to the top of said container, and the space between said carton and said side wall being adapted to receive the detached front wheel positioned to overlap said fork and a portion of the frame, and a cushion and spacer for the rear wheel arranged between the same and the rear wall of the case, one of the cranks of said bicycle being placed against said front wheel to hold the same from shifting rearward.

13. A packing case for a bicycle provided with a frame, said case having a container adapted to receive the bicycle frame, a spacer having a width corresponding to the width of the container and positioned in the latter above the bicycle frame with the opposite edges engaging the adjacent side walls of the container, means removably connecting opposite ends of the spacer to the bicycle frame, means supporting the front wheel of the bicycle in the container to one side of the frame including a spacer having the upper end secured to the first mentioned spacer and having the lower end apertured to receive the axle of the front wheel.

14. A packing case for a bicycle provided with a frame, and a front wheel having a threaded axle, said case having a container of sufficient size to receive the bicycle frame and front wheel with the wheel positioned to one side of the bicycle frame, the wall of the container adjacent the wheel having an opening therethrough for receiving one end of the threaded axle and means threaded on said axle for clamping the wheel against said wall of the container.

LAWRENCE W. REAUME.